(12) United States Patent
Hamid et al.

(10) Patent No.: US 7,673,333 B2
(45) Date of Patent: Mar. 2, 2010

(54) FLEXIBLE METHOD OF SECURITY DATA BACKUP

(76) Inventors: Laurence D. Hamid, 124 Pretoria Ave., Ottawa, Ontario (CA) K1S 1W9; Robert Hillhouse, 245 Irving Pl., Ottawa, Ontario (CA) K1Y 1Z9

( * ) Notice: Subject to any disclaimer, the term of this patent is extended or adjusted under 35 U.S.C. 154(b) by 365 days.

(21) Appl. No.: 11/768,002

(22) Filed: Jun. 25, 2007

(65) Prior Publication Data

US 2007/0289003 A1 Dec. 13, 2007

Related U.S. Application Data

(62) Division of application No. 09/653,804, filed on Sep. 1, 2000, now Pat. No. 7,251,828.

(51) Int. Cl.
*H04L 9/32* (2006.01)
*H04L 9/00* (2006.01)

(52) U.S. Cl. .............................. 726/9; 713/172; 713/185
(58) Field of Classification Search ................. 713/172, 713/185; 726/9
See application file for complete search history.

(56) References Cited

U.S. PATENT DOCUMENTS

| | | | |
|---|---|---|---|
| 5,495,533 A * | 2/1996 | Linehan et al. | 713/155 |
| 5,604,801 A * | 2/1997 | Dolan et al. | 713/159 |
| 5,761,306 A * | 6/1998 | Lewis | 380/282 |
| 6,038,665 A * | 3/2000 | Bolt et al. | 713/176 |
| 6,052,468 A * | 4/2000 | Hillhouse | 380/281 |
| 6,219,439 B1 * | 4/2001 | Burger | 382/115 |
| 6,240,187 B1 | 5/2001 | Lewis | 380/282 |
| 6,611,850 B1 * | 8/2003 | Shen | 707/204 |
| 6,654,797 B1 * | 11/2003 | Kamper | 709/220 |
| 6,981,152 B2 * | 12/2005 | Du et al. | 713/193 |
| 2002/0031230 A1 * | 3/2002 | Sweet et al. | 380/278 |

OTHER PUBLICATIONS

Harvey, Mike. "Why veins could replace fingerprints and retinas as most secure form of ID." *Times Online* Nov. 11, 2008, 2 pages <http://technology.timesonline.co.uk/tol/news/tech_and_web/articles5129384.ece>.

* cited by examiner

*Primary Examiner*—Kaveh Abrishamkar
(74) *Attorney, Agent, or Firm*—Perkins Coie LLP

(57) ABSTRACT

A method of supporting a substantially secure backup copy of a key-server database, said database comprising security information specific to a plurality of users, absent the need for a duplicate key-server is disclosed. According to the method, each individual's security data is stored within the key-server database and is also stored on a portable data storage device, such as a smart card or a PCMCIA token. If the key-server crashes and the database stored thereon is lost, a duplicate key-server database is reconstructed using the aggregate of the partial database files stored on each individual's portable data storage device. Similarly, when a portable data storage device is lost, it can be rebuilt from the data stored within the key-server.

20 Claims, 7 Drawing Sheets

FLEXIBLE METHOD OF SECURITY DATA BACKUP

CROSS-REFERENCE TO RELATED APPLICATION

This application is a Divisional of U.S. patent application Ser. No. 09/653,804 filed Sep. 1, 2000.

FIELD OF THE INVENTION

This invention relates generally to authorization of individuals and more particularly relates to a method of storing security data in a secure and retrievable fashion.

BACKGROUND OF THE INVENTION

Computer security is fast becoming an important issue. With the proliferation of computers and computer networks into all aspects of business and daily life—financial, medical, education, government, and communications—the concern over secure file access is growing. Using passwords is a common method of providing security. Password protection and/or combination type locks are employed for computer network security, automatic teller machines, telephone banking, calling cards, telephone answering services, houses, and safes. These systems generally require the knowledge of an entry code that has been selected by a user or has been preset.

Preset codes are often forgotten, as users have no reliable method of remembering them. Writing down the codes and storing them in close proximity to an access control device (i.e. the combination lock) results in a secure access control system with a very insecure code. Alternatively, the nuisance of trying several code variations renders the access control system more of a problem than a solution.

Password systems are known to suffer from other disadvantages as well. In most cases, a user specifies the password. Most users, being unsophisticated users of security systems, choose passwords that have a personal connection or significance; this practice makes the password not only easy to remember but also relatively insecure. As such, many systems that rely solely on password protection are easily accessed by an unauthorized third party through a simple trial and error process.

A security access system that provides substantially secure access and does not require a password or access code is a biometric identification system. A biometric identification system accepts unique biometric information from a user and identifies the user by matching the information against information belonging to registered users of the system. One such biometric identification system is a fingerprint recognition system. In this type of system, the finger under investigation is usually pressed against a flat surface, such as a side of a glass plate; the ridge and valley pattern of the fingertip is sensed by a sensing means such as an interrogating light beam. Fingerprint identification devices of this nature are routinely used to control the building-access or information-access of individuals to buildings, rooms, and devices such as computer terminals.

Various optical devices are known which employ prisms upon which a finger whose print is to be identified is placed. The prism has a first surface upon which a finger is placed, a second surface disposed at some angle to the first surface through which the fingerprint is viewed and a third illumination surface through which light is directed into the prism. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 5,109,427 and 5,233,404.

U.S. Pat. No. 4,353,056 in the name of Tsikos issued Oct. 5, 1982, discloses an alternative kind of fingerprint sensor that uses a capacitive sensing approach. The described sensor has a two-dimensional, row and column, array of capacitors, each comprising a pair of spaced electrodes, carried in a sensing member and covered by an insulating film. The sensors rely upon deformation to the sensing member caused by a finger being placed thereon so as to vary locally the spacing between capacitor electrodes, according to the ridge/trough pattern of the fingerprint, and hence, the capacitance of the capacitors. In one arrangement, the capacitors of each column are connected in series with the columns of capacitors connected in parallel and a voltage is applied across the columns. In another arrangement, a voltage is applied to each individual capacitor in the array. Sensing in the respective two arrangements is accomplished by detecting the change of voltage distribution in the series connected capacitors or by measuring the voltage values of the individual capacitances resulting from local deformation. To achieve this, an individual connection is required from the detection circuit to each capacitor.

The analysis of fingerprints is discussed in the following references, which are hereby incorporated by reference:

Xiao Qinghan and Bian Zhaoqi,: An approach to Fingerprint Identification By Using the Attributes of Feature Lines of Fingerprint," IEEE Pattern Recognition, pp 663, 1986;

C. B. Shelman, "Fingerprint Classification—Theory and Application," Proc. 76 Carnahan Conference on Electronic Crime Countermeasures, 1976;

Feri Pernus, Stanko Kovacic, and Ludvik Gyergyek, "Minutaie Based Fingerprint Registration," IEEE Pattern Recognition, pp 1380, 1980;

J. A. Ratkovic, F. W. Blackwell, and H. H. Bailey, "Concepts for a Next Generation Automated Fingerprint System," Proc. 78 Carnahan Conference on Electronic Crime Countermeasures, 1978;

K. Millard, "An approach to the Automatic Retrieval of Latent Fingerprints," Proc. 75 Carnahan Conference on Electronic Crime Countermeasures, 1975;

Moayer and K. S. Fu, "A Syntactic Approach to Fingerprint Pattern Recognition," Memo Np. 73-1 8, Purdue University, School of Electrical Engineering, 1973;

Wegstein, *An Automated Fingerprint Identification System*, NBS special publication, U.S. Department of Commerce/National Bureau of Standards, ISSN 0083-1 883; no. 500-89, 1982;

Moenssens, Andre A., *Fingerprint Techniques*, Chilton Book Co., 197 1; and, Wegstein and J. F. Rafferty, The LX39 Latent Fingerprint Matcher, NBS special publication, U.S. Department of Commerce/National Bureau of Standards; no. 500-36, 1978.

Although biometric authentication is a secure means of identifying a user, it has not penetrated the marketplace sufficiently to be on most desktops. Further, since most forms of biometric authentication require specialised hardware, market penetration is slow and requires both acceptance of the new hardware and a pressing need. The motivation for a company to establish such sophisticated user authentication systems, despite the considerable time and resources that are involved, is the potential that they will incur even greater losses in the event that an unauthorized third party gains access to their secure files.

Secure files are often stored on a computer or network server only in an encrypted form. A user wishing to have access to an encrypted file must first be authenticated as an authorized user of the system. Once the user has been authenticated, a key is provided to the user for the purpose of decrypting the contents of the electronic file and thus allowing the user access to the file.

Key management systems are well known. One such system, by Entrust® Technologies Limited is currently commercially available. Unfortunately, current key management systems are designed for installation on a single computer for use with a single fixed user authorization method and for portability between computers having a same configuration. As such, implementation of enhanced security through installation of biometric input devices is costly and greatly limits portability of key databases. For example, when using Entrust® software to protect a key database, the database is portable on a smart card or on a floppy disk. The portable key database is a duplicate of the existing key database. User authentication for the portable key database is identical to that of the original key database. The implications of this are insignificant when password user authentication is employed; however, when biometric user authentication such as retinal scanning or fingerprint identification are used, the appropriate biometric identification system is required at each location wherein the portable key database is used.

To minimize the risk of key compromise the members of an organisation are permitted to travel with limited portable key databases, preferably restricted to the secure keys of a single user.

Another system that is known for key management includes a key-server. A key-server is a single system that provides keys to individuals upon identification or authorization. Such a system is useful in large organisations since it permits changing of system access codes without requiring every user to provide their personal key data storage device. Because of the extreme problems associated with losing secure keys, it is essential that a key-server be backed up appropriately. Further, it is necessary that the key-server be available at all times. This is currently achieved through duplication of key-servers. Unfortunately, key-servers are costly and this makes their implementation problematic in some instances. For example, a company performing a trial of a new user access system, such a fingerprint identification system, often purchases and installs only a handful of "test" workstations. Thus, to try out ten (10) fingerprint scanners with a key-server configuration requires two robust key-servers having full backup capabilities, a main key-server and a duplicate key-server, and 10 fingerprint imagers. Since a fingerprint imager is likely to cost much less than 10% of the cost of the key-servers, the additional cost is extremely undesirable, dissuading potential customers from performing trials. Eliminating a need for a duplicate key-server would be highly advantageous.

Another serious limitation of key management systems configured with a key-server is that individuals do not have access to secure files when they are other than at a workstation in communication with the key-server. Individuals who are required to fly during a business trip may wish to avail themselves of the extra time to edit a report, for example, which is stored on a local hard drive within a portable computer. The electronic file containing the report, however, is stored only in an encrypted form. In order to decrypt the file, the user must first be authenticated by and then receive a key from a key-server. Since a key-server is generally other than accessible when the user is other than at work, the user's ability to perform tasks from remote locations is greatly reduced. It would be advantageous to provide a system to allow a user to gain access to a system using a portable key storage device and, as such, have access to a predetermined set of keys both at work and elsewhere.

OBJECT OF THE INVENTION

In an attempt to overcome these and other limitations of the prior art, it is an object of this invention to provide a method of backing-up the secure key information stored on a main key-server without a need for a second duplicate key-server.

SUMMARY OF THE INVENTION

According to this method, the secure key database that is stored on an organizations main key-server is backed-up in a distributed fashion. Each user carries with them only that part of the whole database that is related specifically to that user. Since the portable data storage device contains only those secure keys that are assigned to and associated with one specific user, only a small number of secure keys may be compromised in the event that a single portable data storage device is lost. Further, when the personal data storage device is in the form of a token, the secure keys stored internal to the token in non-volatile memory means and are not accessible outside the module. The keys cannot be viewed or extracted from the token in the event that it is lost, thus providing additional security.

In accordance with the invention there is provided a method of restoring data of a key-server in communication with a communication network comprising the steps of: providing the key-server in communication with the communication network; providing to at least a computer in communication with the communication network, a plurality of portable data storage devices each having stored thereon security data relating to a single authorized user; copying from each of the plurality of portable data storage devices, security data relating to the single authorized user.

In accordance with the invention there is also provided a method of backing up data of a key-server in communication with a communication network comprising the steps of: providing the key-server in communication with the communication network, the key-server having stored thereon the unique user identification information for a plurality of authorized users of the communication network and the security data for use by the specific authorized user in accessing data within the network; providing to at least a computer in communication with the communication network, a portable data storage device; receiving user identification data indicative of an authorized user of the communication network; and, copying from the key-server to the portable data storage device, security data relating to the authorized user for use by the specific authorized user in accessing data within the network.

In accordance with the invention there is further provided a method of authenticating an individual for allowing access to secure data or secure keys stored on a communication network when other than in communication with a central key-server comprising the steps of providing at least a computer in communication with the communication network; determining at least an available user information entry device from a plurality of known user information entry devices; determining the availability of one of a key-server and a portable data storage device in communication with the computer; receiving user identification information via the at least an available user information entry device; authenticating the individual for access to at least one of the secure data and secure keys stored on the determined one of a key-server and a portable data storage device.

It is an advantage of the present invention that a user can gain access to a system using a portable key storage device and, as such, has access to a predetermined set of keys both at work and elsewhere. It is a further advantage that the portable key storage device acts as a data backup for a portion of the keys within the key-server thus eliminating a need to have a duplicate key-server.

It is another advantage of the present invention that the keys stored on the key-server and on the portable backup are secured against access by individuals and that security is maintainable even when copying keys.

BRIEF DESCRIPTION OF THE DRAWINGS

An exemplary embodiment of the invention will now be described in conjunction with the attached drawings, in which.

DETAILED DESCRIPTION OF ILLUSTRATIVE EMBODIMENTS

The invention is described with respect to passwords, tokens, and biometric verification in the form of fingerprint registration. The method of this invention is applicable to other verification processes as is evident to those of skill in the art.

One of the many problems associated with the use of a fingerprint biometric is that a special contact-imaging device is required to image a fingerprint. Today, many systems and, in particular, many personal computers are not equipped with a contact imaging device. It is well known to outfit a network of workstations with biometric imaging devices in order to overcome these limitations. Unfortunately, for those who travel on business and need access to sensitive data in the form of network data or encrypted email, such a solution is not always possible and convenient. Another known solution is to travel with a portable contact-imaging device. Unfortunately, the cost of purchasing the special software and the additional hardware that are required to implement such a system makes this approach impractical in most cases. Also, many different biometric identification techniques are now known and available. It is impractical to install hardware and software in order to switch between verification methods. According to the invention, a method is proposed for providing a flexible authentication process that maintains security of an overall system without causing undue inconvenience or limitations.

One of the many factors slowing widespread introduction of fingerprint-based authentication is the need for key-servers. A key-server is a mission critical system for providing fingerprint authentication data and other security data. Unfortunately, in order to run a trial of a fingerprint security system a main key-server and a duplicate key-server are necessary. Thus, a user is forced to purchase two mission critical quality systems in order to implement a field trial. When the field trial involves of thousands of workstations, it is cost effective. However, when the field trial is, as is more typical, of 10 or 20 workstations, the costs for that trial are excessive.

Figure 1A:
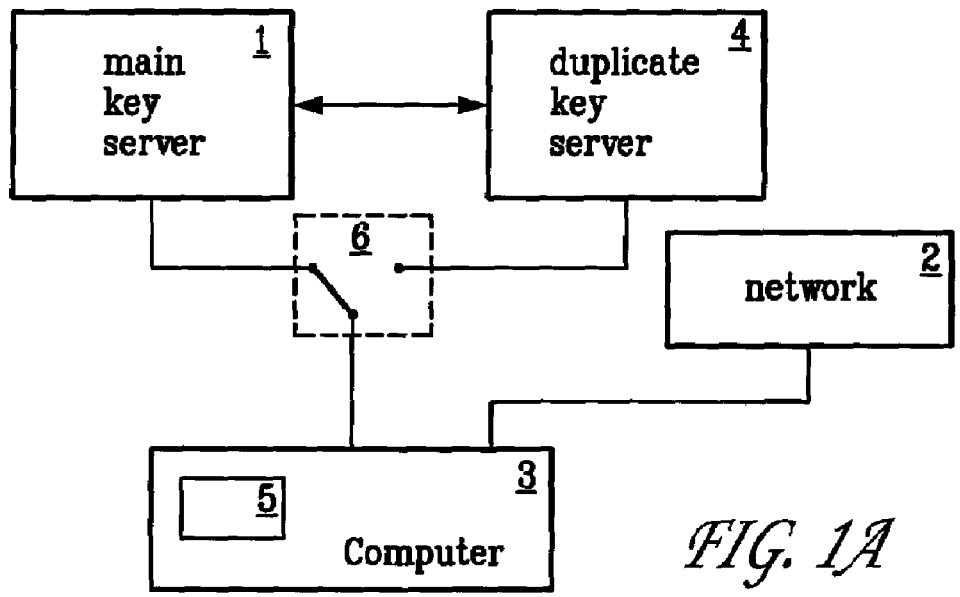
FIG. 1a is a simplified block diagram of a prior art method of storing key data on a main key-server and of storing backup key data on a duplicate key-server is shown.

Referring to FIG. 1a, a simplified block diagram of a prior art method of storing key data on a main key-server 1 and of storing backup key data on a duplicate key-server 4 is shown. As seen in the block diagram a main key-server 1 is provided with all security data relating to a network 2. A user wishing to access data on the network 2 via a computer 3 provides user authorization information to the computer 3 using an available user information entry device 5, which is peripheral to the computer 3. If the supplied user authorization data matches the user authorization data stored on the key-server, the user is authenticated. The authorization process may occur within the computer 3 based on data retrieved from the main key-server 1 or alternatively may occur on the main key-server 1 using data stored therein. The user now has access to data secured with keys stored on the main key-server 1 and to which the user is provided access. The user information entry device 5 may be a standard keyboard, or alternatively a biometric imaging device such as a fingerprint imager or a retina scanner. Of course, the user information entry device may also comprise any one of a plurality of other known devices, either individually or in combination with at least one other known device, depending upon the level of security that is required for a specific application.

Figure 1B:
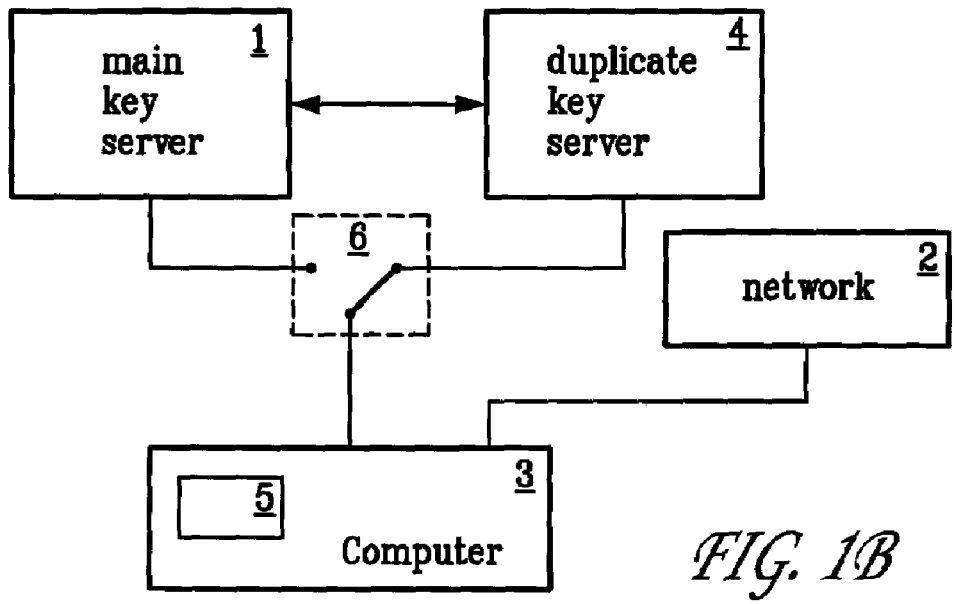
FIG. 1b is a simplified block diagram of a prior art method of FIG. 1a, in which the duplicate key-server has been activated following a crash of the main key-server, is shown.

Referring to FIG. 1b, a simplified block diagram of a prior art method of FIG. 1a, in which the duplicate key-server has been activated following a crash of the main key-server, is shown. When the main key-server 1 fails, the duplicate key-server 4 is automatically activated by the action of some electronic switching means 6, and immediately begins providing identical services to those provided by the main key-server 1. Using data mirroring techniques, the data within the main key-server 1 and within the duplicate key-server 4 are identical and as such, no data is lost and no interruption to use of the network 2 occurs.

Unfortunately, the prior art systems that require duplicate key-servers are too costly to be implemented for smaller networks. In addition, the complete loss of both the main key-server 1 and the duplicate key-server 4, for example as the result of a fire, flood, electrical system failure or another similar unforeseeable incident, results in the permanent or temporary loss of the secure key database. Such a catastrophic occurrence will result in the lengthy or even permanent inability of authorized individuals to access secure files etc. on the network.

Figure 2:
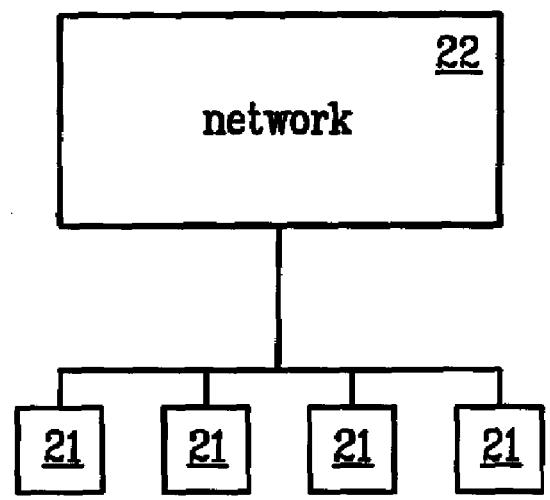
FIG. 2 is a simplified block diagram of another prior art method of storing key data on a users system without backup key data is shown.

Referring to FIG. 2, a simplified block diagram of another prior art method of storing key data on a user's computer system, absent backup key data, is shown. Here, a plurality of computers 21 is connected to a network 22. Each computer has stored thereon, key data specific to a user of that computer. The user logs onto the computer and has access to their key data. Such a system is problematic for many reasons. Firstly, the system is only as secure as each computer. Secondly, there is no central control over keys and access to keys. Thirdly, keys are easily lost during system upgrades or crashes. Fourthly, a user is confined to using a single computer within the network. With today's trends toward mobile offices and so forth, it would be advantageous not to limit users in any of these ways.

Figure 3:
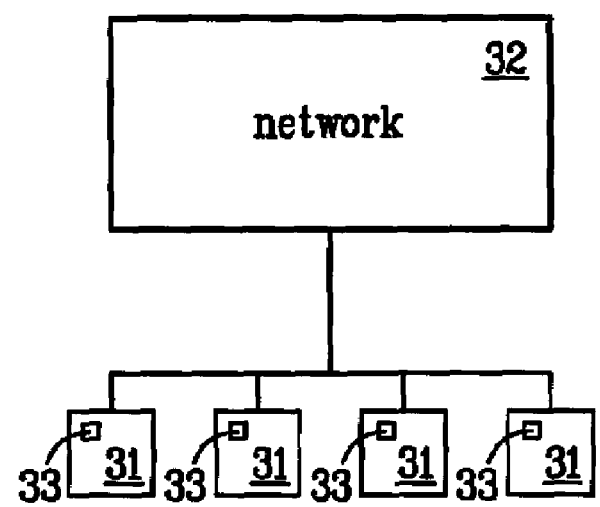
FIG. 3 is a simplified block diagram of yet another prior art method of storing key data on a users system with backup key data stored on floppy disks is shown.

Referring to FIG. 3, a simplified block diagram of yet another prior art method of storing key data on a users computer 31 with backup key data stored on floppy disks 33 is shown. Here the chances of losing security data are reduced over those presented with reference to FIG. 2, but not by much. The floppy disks 33 now must be centrally managed to ensure correct labeling and to ensure that the data is actually backed up according to a regular schedule, and so forth. The use of an insecure medium, such as a computer floppy disk 33, also renders the backup key data stored thereon more vulnerable to extraction and use by an unauthorized third party.

As such, only the system of FIG. 1 meets the security objectives of most business needs. Unfortunately the system of FIG. 1 is too expensive to be implemented on most small-scale networks. In the case of a field trial of a small number of biometric information entry devices, say approximately fifty (50) fingerprint imagers, the cost of purchasing a duplicate key-server is very significant compared to the cost of purchasing the biometrics. Obviously, a method that obviates the need for a duplicate key-server and additionally provides a method for storing a duplicate secure key database would be of great value for use in small-scale networks.

Figure 4:
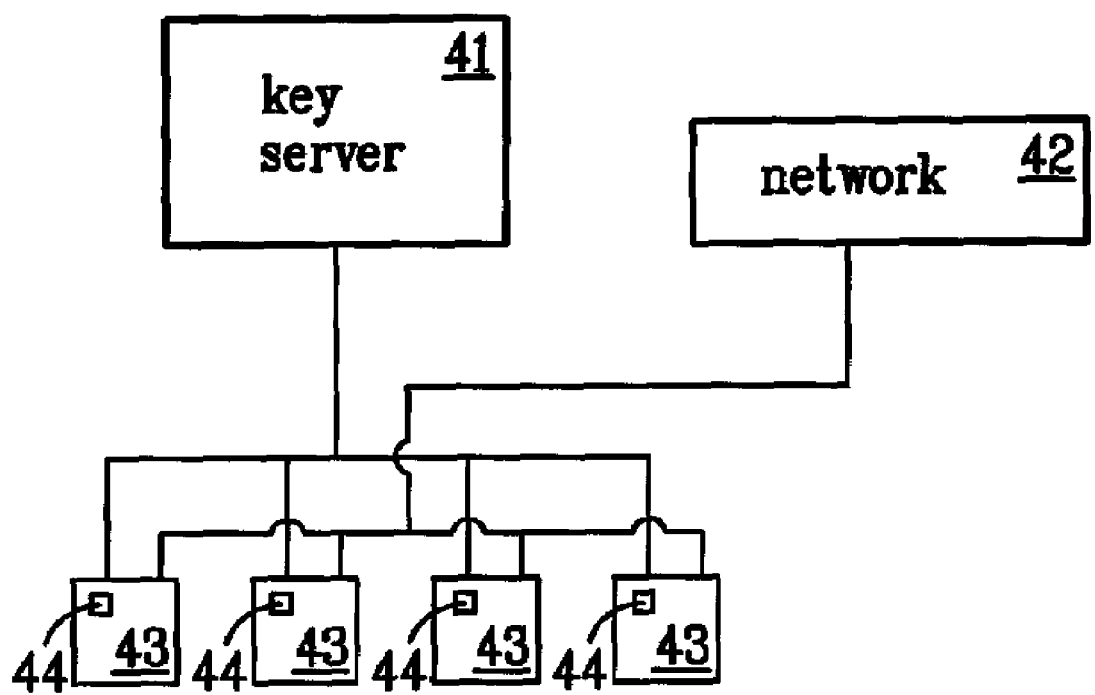
FIG. 4 is a method according to the invention of storing key data on a key-server with distributed backup key data stored remotely absent a second key-server is shown.

Referring to FIG. 4, a method according to the invention of storing key data on a key-server with distributed backup key data stored remotely on portable data storage devices and absent a duplicate key-server is shown. Here a key-server 41 is shown coupled to a plurality of computers 43. Each computer 43 has an interface (not shown) for interfacing with a portable data storage device 44 in the form of a token or a smart card. Of course another portable data storage device is also useful, such as a floppy disk.

Within the key-server 41 is stored all security data including user authentication data and secure keys. Each individual also maintains a personal copy of the secure data and of the authentication data within their own portable data storage device 44. When a user seeks to access the network, they provide their portable data storage device 44 and then authorize themselves. Thus, the functions of key-server 41 are not required by most individuals, such individuals being engaged only in routine activities while at a workplace. Occasionally, individuals may be required to provide their portable data storage device for the transfer of updated or revised security data from the key-server; however, this is not considered a routine activity.

When the user forgets their portable data storage device 44, the data is available from the key-server 41. Thus access to the network is still available. When the portable data storage device 44 is lost, it can be reissued by copying the data again from the key-server 41. Conversely, when the key-server 41 crashes, its data files are rebuilt from each of the portable data storage devices 44. As such, the need for a backup key-server is obviated. In particular, the use of portable data storage devices 44 for storing personal key data and for use in the authorization and key management functions of security results in a situation wherein use of the key-server 41 is limited to very specific circumstances—lost portable data storage device, forgotten portable data storage device, etc. As long as a portable data storage device isn't lost on the same day as a key-server failure including data loss, all data is recoverable. As such the duplicate key-server is unnecessary. Similarly, when the key-server crashes, only those individuals who are without their portable data storage devices are inconvenienced since everyone else can access the network 42 and their secure keys.

When cryptographic functions are performed within the portable storage devices 44, the secure keys are not available outside the portable storage devices 44. Since most cryptographic functions are performed on the portable storage devices 44, the key-server can support the processing of cryptographic functions for those individuals with forgotten portable storage devices 44. If a secure path is initiated between portable storage devices 44 and the key-server 41, then the keys stored within the two media are not available for capture or compromise.

Figure 5:
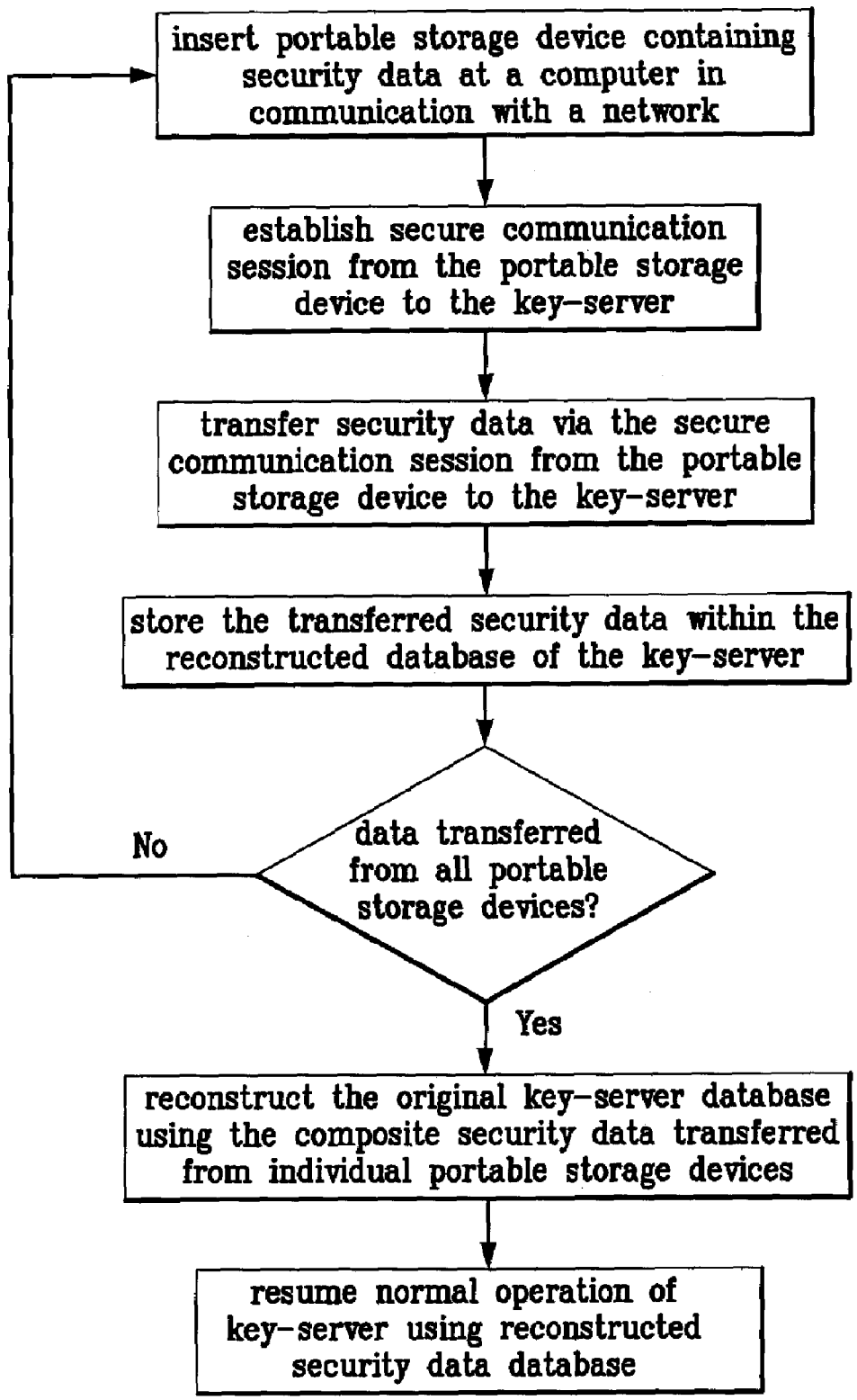
FIG. 5 is a simplified flow diagram of a method implemented upon key-server failure is shown.

Referring to FIG. 5, a simplified flow diagram of a method implemented upon a key-server failure is shown. A portable data storage device containing an individual's security data and authorization information is mated with an interface peripheral to a computer in communication with the key-server. A secure communication session is established from the portable data storage device to the key-server. Security data for an individual user stored within the memory means of the portable data storage device is transferred via the secure communication session to the key-server and stored within the memory means thereon. Since each portable data storage device contains only a portion of the original secure key database that existed on the key-server, it is necessary to repeat this procedure for every individual's portable data storage device. Once all of the secure key data has been transferred from the portable data storage devices, the original database is essentially completely reconstructed and normal key-server functions resume.

Figure 6A:
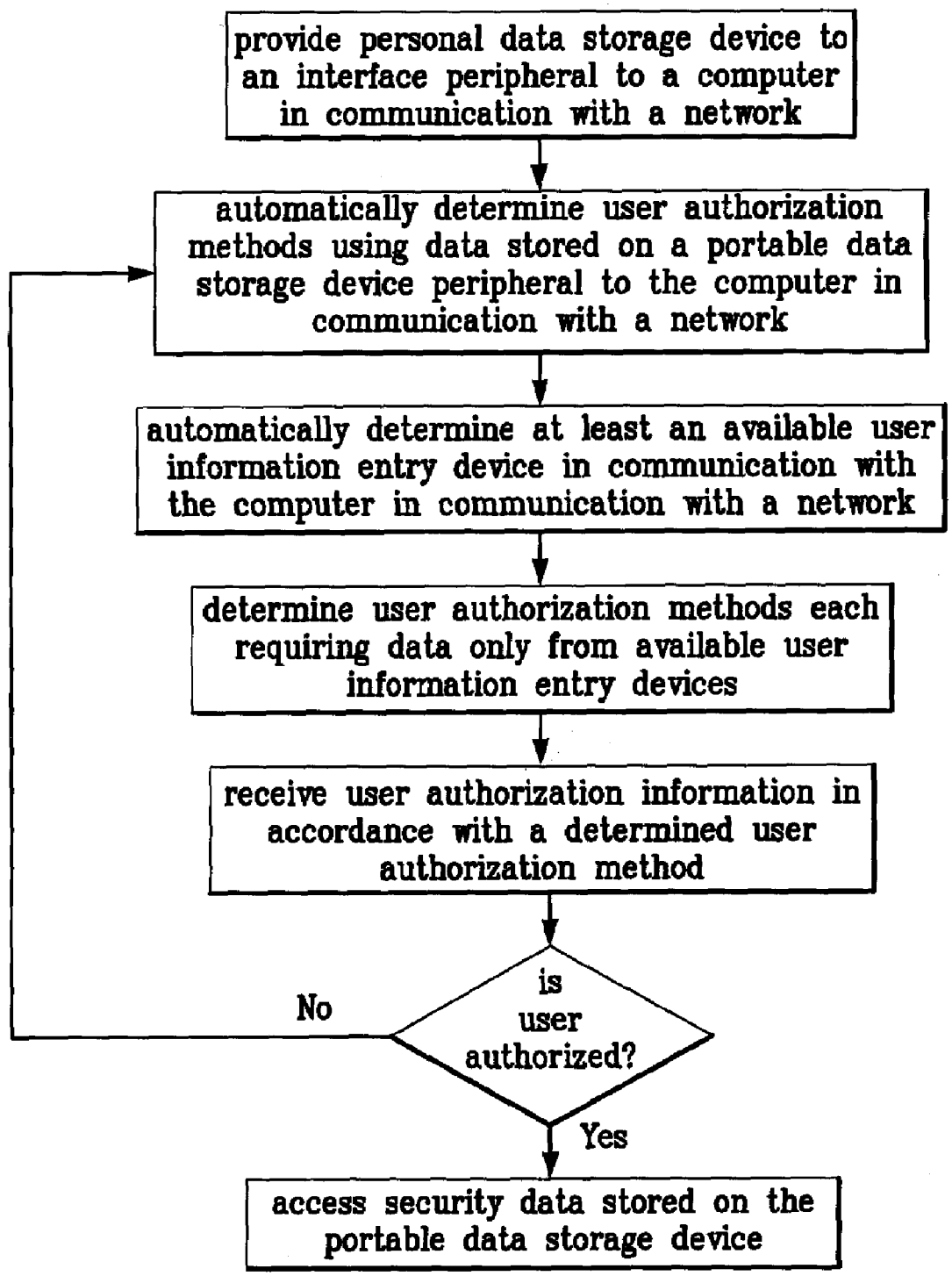
FIG. 6a is a simplified flow diagram of a method of user authorization making use of security data stored on a portable data storage device is shown.

Referring to FIG. 6a, a simplified flow diagram of a method of user authorization making use of security data stored on a portable data storage device is shown. Authorization making use of a portable data storage device is likely to occur when the user is other than in the workplace, for example during times of travel or when working from a home office or other remote location. Of course, the portable data storage device is used in the workplace as well, especially when the functions of the key-server are limited to specific instances as was previously described. The user wishing to obtain authorization for access to secure keys or files on the network provides their portable data storage device, in the form of a smart card or a token, containing personal security information including authentication methods at a computer in communication with a communication network. The presence of available user information entry devices in communication with the computer, from a plurality of user information entry devices, is determined. The user provides data via at least an available user information entry device. This could involve entering a password via a standard computer keyboard, or providing biometric data such as a fingerprint using an available fingerprint imaging station. The data provided by the user is registered against known data for that user, stored in the portable data storage device. If the data provided by the user matches the data stored in the portable storage device, the user is authorized for access to selected secure keys and secure files.

Figure 6B:
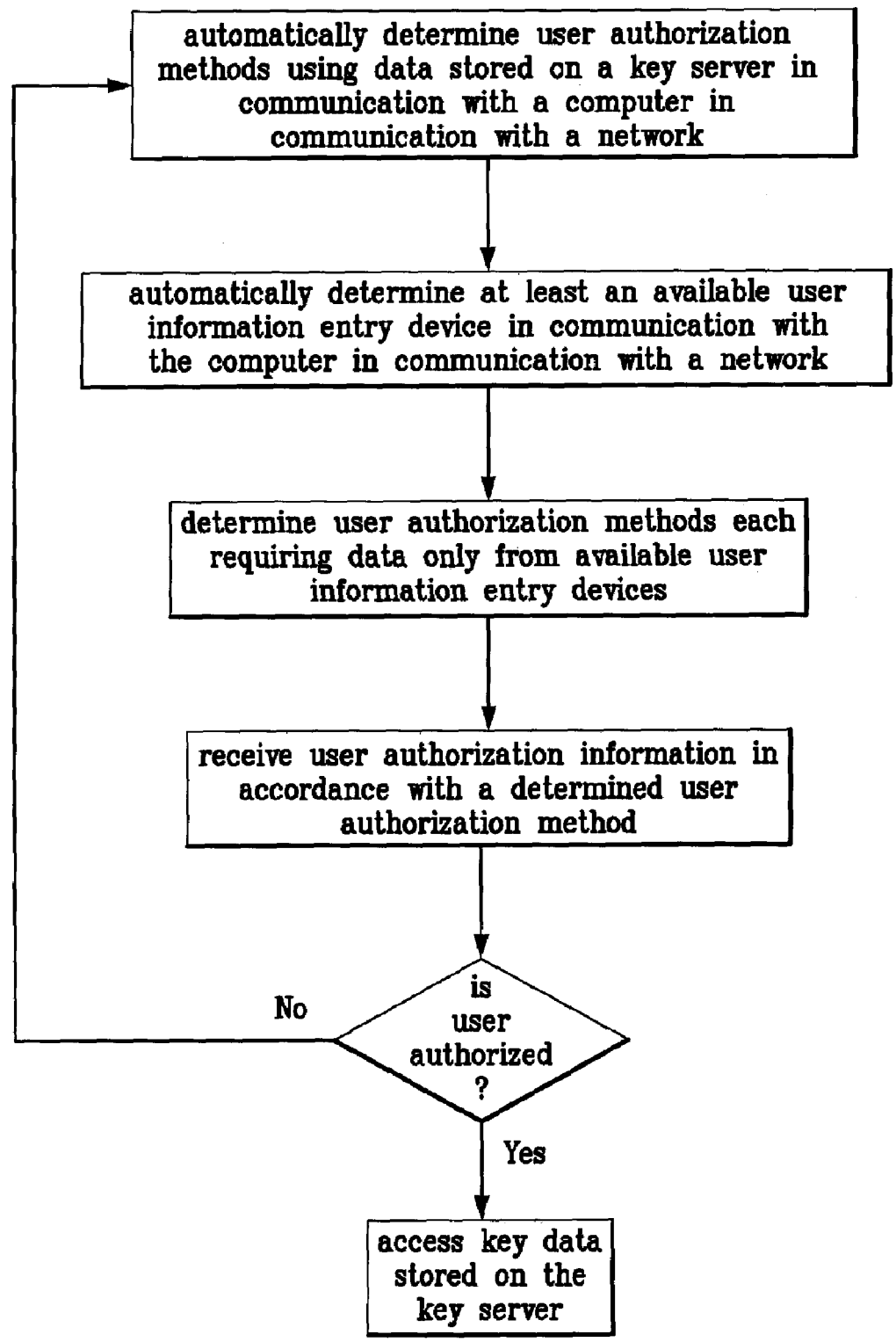
FIG. 6b is a simplified flow diagram of a method of user authorization making use of security data stored on a locally available key-server is shown.

Referring to FIG. 6b, a simplified flow diagram of a method of user authorization making use of security data stored on a key-server is shown. Authorization making use of security data stored on a key-server would typically occur only in instances when an individual has lost or forgotten their portable data storage device. The presence of available user information entry devices in communication with a computer in communication with a communication network, from a plurality of user information entry devices, is determined. The user provides data via at least an available user information entry device. This could involve entering a password via a standard computer keyboard, or providing biometric data such as a fingerprint using an available fingerprint imaging station. The data provided by the user is registered against known data for that user, which is stored on the key-server. If the data provided by the user matches the data stored in the key-server, the user is authorized for access to selected secure keys and secure data files. Alternatively, the user is authorised for access to selected key-server functions in the form of cryptographic functions.

Figure 7:
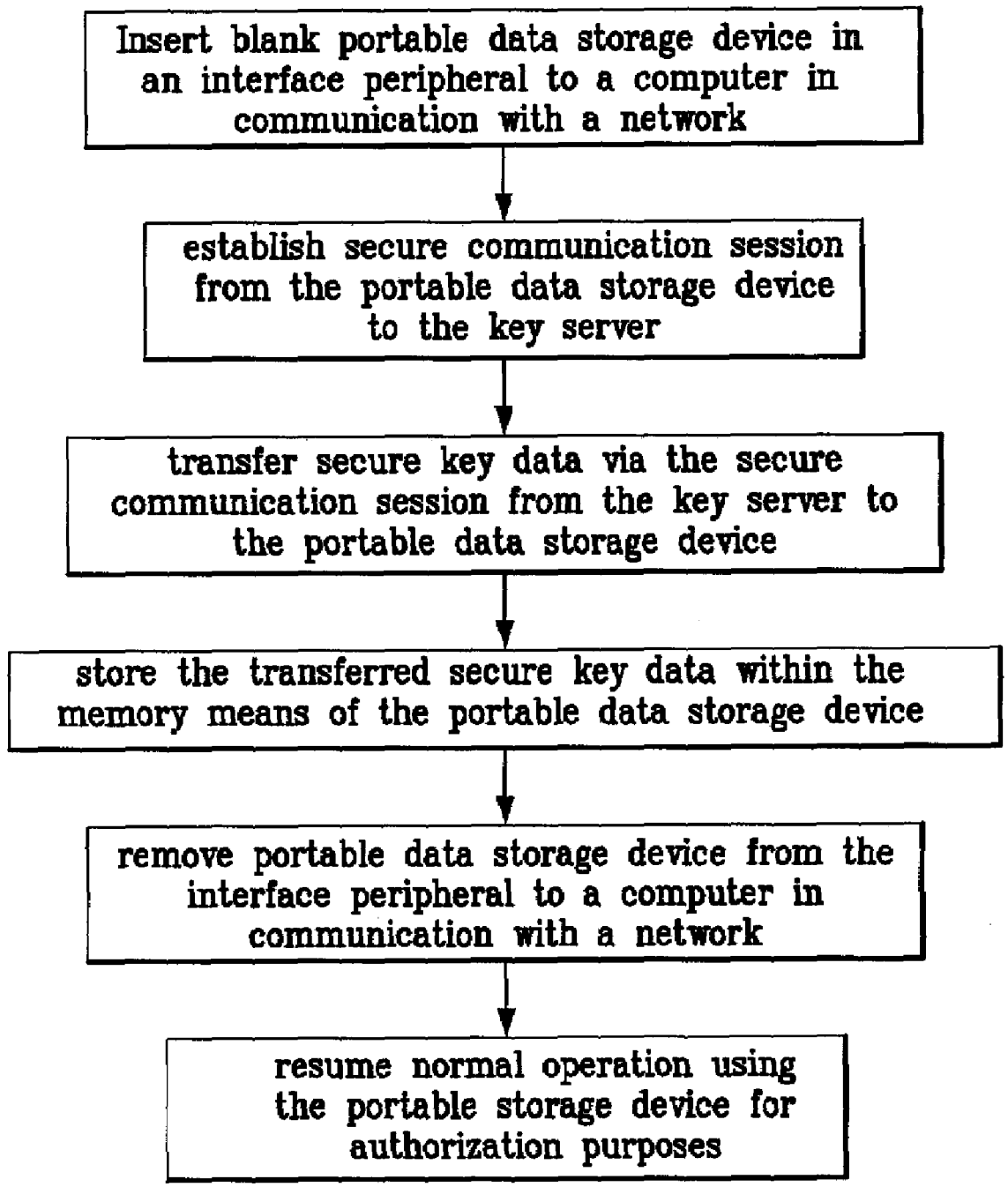
FIG. 7 is a simplified flow diagram of a method of replacing a portable data storage device is shown.

Referring to FIG. 7, a simplified flow diagram of a method of replacing a portable data storage device is shown. This procedure is performed, for example, in the event that a user has permanently lost their original portable storage device containing their personal security information. A blank portable data storage device, in the form of a smart card or token, is inserted into an interface peripheral to a computer in communication with a communication with a network. The interface includes a means for writing data to the portable data storage device. A secure communication session is established from the portable data storage device to the key-server. Secure key data, specific to an individual user, is transferred from the key-server to the portable data storage device via the secure communication session. The transferred secure key data is stored within the memory means of the portable data storage device. The portable data storage device, containing the transferred personal security data, is removed from the interface peripheral to the computer in communication with a network and can be used for the purpose of authorizing the user.

Numerous other embodiments may be envisaged without departing from the spirit and scope of the invention.

What is claimed:

1. A method of authenticating an individual for allowing access to secure data or secure keys stored on a communication network when a secure key associated with the individual and stored on a central key-server is not available, comprising:
   determining a presence of a portable data storage device in communication with a computer that is in communication with the communication network;
   determining that a secure key associated with the individual stored on the central key-server is not available;
   when the portable data storage device is in communication with the computer, determining the availability of a secure key associated with the individual stored on a second key-server, the second key server being other than the central key-server, the second key server supporting communication with the computer; and
   upon determining that the secure key associated with the individual and stored on the second key-server is not available, authenticating the individual for access to secure data and/or secure keys stored on the portable data storage device when the portable data storage device is in communication with the computer.

2. A method as defined in claim 1 further comprising:
   determining from a plurality of known user information entry devices an available user information entry device in communication with the computer;
   receiving user identification information via the available user information entry device; and
   registering the received user identification information against user identification information stored in the portable data storage device.

3. A method as defined in claim 2 comprising:
   receiving identification information associated with a specific user via the available user information entry device;
   registering the received user identification information against security data associated with the individual and stored in the portable data storage device; and
   providing secure keys to the individual to allow access to encrypted data files that the individual has been authenticated to access.

4. A method as defined in claim 2 comprising:
   receiving identification information associated with a specific user via the available user information entry device;
   registering the received user identification information against security data for that user and stored in the portable data storage device; and
   providing cryptographic functions within the portable data storage device using the secure keys associated with the authenticated user.

5. A method as defined in claim 2 wherein when the portable data storage device is not in communication with the computer, the user is prompted to provide a portable data storage device.

6. A method as defined in claim 2 comprising authenticating the individual for access to the secure data and/or secure keys stored on the second key server when the portable data storage device is not in communication with the computer.

7. A method as defined in claim 6 comprising:
   receiving unique user identification information via the available user information entry device;
   registering the received user identification information against security data for that user that is stored in the second key server; and
   providing secure keys to the user to allow access to encrypted data files that the user has been authenticated to access.

8. A method as defined in claim 6 comprising:
   receiving unique user identification information via the available user information entry device;
   registering the received user identification information against security data for that user that is stored in the second key server; and
   providing cryptographic functions within the second key server using the secure keys associated with the authenticated user.

9. A method as defined in claim 1 wherein the portable data storage device provides an individual with access to a predetermined set of keys in a plurality of different locations.

10. A method as defined in claim 9 wherein the method of user authentication required at work is different than the method of user authentication required elsewhere.

11. A method as defined in claim 1 wherein the portable data storage device provides dedicated cryptographic functions for the computer using security data stored internal to the portable data storage device.

12. A method as defined in claim 11 wherein the security data stored internal to the portable data storage device are not accessible in a useable form outside of the second key server and the portable data storage devices.

13. A method as defined in claim 1 wherein the second key server provides dedicated cryptographic functions for the computer using security data stored internal to the second key server.

14. A method as defined in claim 13 wherein the security data stored internal to the second key server are not accessible from outside of the second key server and the portable data storage devices.

15. A system for authenticating an individual for allowing access to secure data or secure keys stored on a communication network when a secure key associated with the individual and stored on a central key-server is not available, comprising:
- a portable data storage device in communication with a computer that is in communication with the communication network;
- means for determining that a secure key associated with the individual stored on the central key-server is not available;
- a second key server different than the central key-server, the second key server supporting communication with the computer;
- means for determining the availability of a secure key associated with the individual stored on the second key-server when the portable data storage device is in communication with the computer; and
- means for authenticating the individual for access to secure data and/or secure keys stored on the portable data storage device when the portable data storage device is in communication with the computer upon determining that the secure key associated with the individual and stored on the second key-server is not available.

16. A system as defined in claim 15 wherein the portable data storage device comprises an interface.

17. A system as defined in claim 16 wherein the portable data storage device is in the form of a token and provides dedicated cryptographic functions for the computer using security data stored internal to the token.

18. A system as defined in claim 17 wherein the security data stored internal to the token are not accessible from outside of the token and therefore cannot be extracted or otherwise read by an unauthorized third party.

19. A system as defined in claim 15 further comprising a biometric information entry device for use as a user information entry device.

20. A method of authenticating an individual for allowing access to secure data or secure keys stored on a communication network when a secure key associated with the individual and stored on a central key-server is not available, comprising:
- determining from a plurality of known user information entry devices an available user information entry device in communication with a computer that is in communication with the communication network;
- receiving user identification information via the available user information entry device;
- determining a presence of a portable data storage device in communication with the computer;
- determining that a secure key associated with the individual stored on the central key-server is not available;
- when the portable data storage device is in communication with the computer, determining the availability of a secure key associated with the individual stored on a second key-server, the second key server being other than the central key-server, the second key server supporting communication with the computer; and
- upon determining that the secure key associated with the individual and stored on the second key-server is not available, authenticating the individual for access to secure data and/or secure keys stored on the portable data storage device when the portable data storage device is in communication with the computer.

* * * * *